US011374922B2

(12) United States Patent
Baier

(10) Patent No.: US 11,374,922 B2
(45) Date of Patent: Jun. 28, 2022

(54) GENERATION OF A PERSONA KEY

(71) Applicant: AT&T INTELLECTUAL PROPERTY I, L.P., Atlanta, GA (US)

(72) Inventor: Anthony L. Baier, Jackson, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 399 days.

(21) Appl. No.: 16/207,934

(22) Filed: Dec. 3, 2018

(65) Prior Publication Data

US 2020/0177573 A1 Jun. 4, 2020

(51) Int. Cl.
| H04L 29/06 | (2006.01) |
| H04L 9/40 | (2022.01) |
| H04L 67/306 | (2022.01) |
| H04L 67/52 | (2022.01) |
| H04L 67/14 | (2022.01) |
| H04W 4/80 | (2018.01) |

(52) U.S. Cl.
CPC ............ *H04L 63/083* (2013.01); *H04L 67/14* (2013.01); *H04L 67/18* (2013.01); *H04L 67/306* (2013.01); *H04W 4/80* (2018.02)

(58) Field of Classification Search
CPC ...... H04L 9/0863; H04L 63/083; G06F 21/31
See application file for complete search history.

(56) References Cited

U.S. PATENT DOCUMENTS

| 6,523,116 B1 | 2/2003 | Berman |
| 7,578,432 B2 | 8/2009 | Libin et al. |
| 7,925,549 B2 | 4/2011 | Looney et al. |
| 7,942,328 B2 | 5/2011 | Snyder et al. |

(Continued)

FOREIGN PATENT DOCUMENTS

| EP | 2891112 B1 | 10/2017 |
| JP | 2008040517 A | 2/2008 |

(Continued)

OTHER PUBLICATIONS

Rouillard, "Contextual QR codes". Computing in the Global Information Technology, 2008. ICCGI'08. The Third International Multi-Conference on. IEEE, 2008. 6 pages.

(Continued)

*Primary Examiner* — Jason K Gee
(74) *Attorney, Agent, or Firm* — Amin, Turocy & Watson, LLP

(57) ABSTRACT

Generating a persona key based on at least internet protocol session information associated with a user equipment and user data associated with the user equipment is disclosed. The disclosed subject matter can enable communication of the persona key to a capturing device to enable a portion of information from a user profile correlated to the persona key to be communicated to a receiving device. In some embodiments, the persona key can further be based on time, date, location, user input, etc. The persona key can be a dynamic representation of identification that can be more secure than conventional static representations. Additionally, the persona key can be communicated by optical, audio, or electromagnetic techniques that can avoid a user having to speak an account number, password, username, etc., to provide access to the portion of the information from the user profile.

20 Claims, 10 Drawing Sheets

(56) References Cited

U.S. PATENT DOCUMENTS

| | | |
|---|---|---|
| 8,671,440 B2 | 3/2014 | Damola et al. |
| 9,401,895 B2 | 7/2016 | Herberg et al. |
| 9,749,131 B2 | 8/2017 | Baghdasaryan |
| 9,760,943 B2 | 9/2017 | Khan |
| 9,768,964 B2 | 9/2017 | Brachetti |
| 9,846,863 B2 | 12/2017 | Grossi et al. |
| 9,929,859 B2 | 3/2018 | Merdinger et al. |
| 2004/0034797 A1* | 2/2004 | Becker Hof ...... H04L 29/12009 726/4 |
| 2005/0029354 A1 | 2/2005 | Frantz et al. |
| 2006/0149640 A1 | 7/2006 | Gordon et al. |
| 2012/0054491 A1* | 3/2012 | Tippett .................. H04L 9/3213 713/168 |
| 2012/0280049 A1 | 11/2012 | Bennett |
| 2013/0054271 A1 | 2/2013 | Langford et al. |
| 2013/0282588 A1* | 10/2013 | Hruska .................. G06Q 20/40 705/67 |
| 2016/0127222 A1* | 5/2016 | Ekler .................. H04L 63/0807 709/239 |
| 2017/0063927 A1* | 3/2017 | Schultz .................. H04L 63/20 |
| 2017/0169264 A1 | 6/2017 | Britt et al. |
| 2017/0243267 A1 | 8/2017 | Lamberton |
| 2018/0005239 A1 | 1/2018 | Schlesinger et al. |
| 2018/0139210 A1* | 5/2018 | Gideon, III ............. H04L 67/22 |
| 2018/0198914 A1 | 7/2018 | Firke et al. |

FOREIGN PATENT DOCUMENTS

| | | |
|---|---|---|
| JP | 2011086198 A | 4/2011 |
| KR | 101266239 B1 | 6/2013 |
| WO | 2014042687 A1 | 3/2014 |
| WO | 2015125065 A1 | 8/2015 |
| WO | 2017203339 A1 | 11/2017 |
| WO | 2018134855 A1 | 7/2018 |
| WO | 2018142272 A1 | 8/2018 |

OTHER PUBLICATIONS

Espejel-Trujillo, et al. "Identity Document Authentication Based on VSS and QR Codes". Procedia Technology 3(2012): pp. 241-250.
Sheth, et al. "Extending the Extended Self in a Digital World". Journal of Marketing Theory and Practice 22.2 (2014): pp. 123-132.
Starnberger, et al. "QR-TAN: Secure Mobile Transaction Authentication". Availability, Reliability and Security, 2009. ARES'09. International Conference on. IEEE, 2009. 6 pages.
Lee, et al. "Online Banking Authentication System Using Mobile-OTP with QR-code". Computer Sciences and Convergence Information Technology (ICCIT), 2010 5th International Conference on. IEEE, 2010. pp. 644-648.

* cited by examiner

GENERATION OF A PERSONA KEY

TECHNICAL FIELD

The disclosed subject matter relates to responding to generating a representation of identification that can be associated with a user identity in a manner that can provide for improved data security.

BACKGROUND

Conventional communication of identification can be burdensome. As an example, providing a user name and password can be increasingly difficult where greater numbers of usernames and passwords act as a representation of an individual in order to provide increased security against loss of control over the use of the identity, e.g., where a username and password are used for multiple representations of an identity than loss of control of the username and password can lead to decreased security, for example, it is generally considered a best practice to have different usernames and passwords for a bank account and an email account such that if the email account username and password are compromised then the bank account is not also compromised. However, where individuals can have many accounts, managing the many representations can result in having to remember many usernames and passwords, etc. Furthermore, communicating a username and password can itself be problematic, such as providing a username and password in a public setting, for example, to allow a clerk access to your account when upgrading a service, adding new equipment to an account, etc. Some emerging technologies, such as biometric identification, etc., have attempted to remedy these issues by allowing a biometric marker to act as a representation of identification. For example, a thumbprint can act as a representation of identification in place of a username and password, such as for logging into a device, into an account, etc. Similarly, use of irises, vocal prints, hand shapes, etc., have all been used as representations of identification. However, these biometric technologies can also be unsavory, such as where a user may not want to physically touch a scanner, may have religious objections, etc. As such, an alternative representation of identity can be desirable.

DETAILED DESCRIPTION

Figure 1:
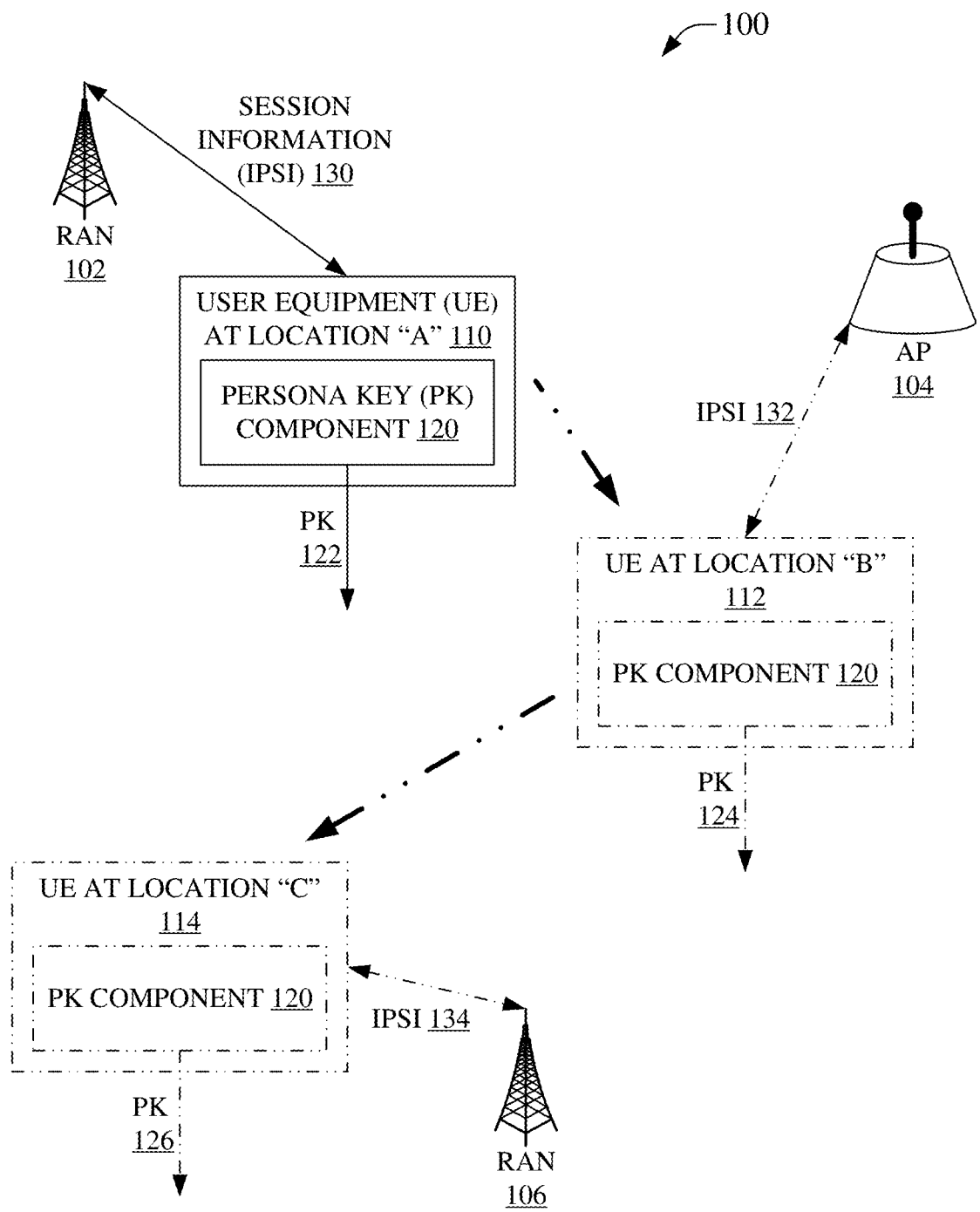
FIG. 1 is an illustration of an example system that can facilitate generation of a persona key based on session identification for a user equipment, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In contrast to conventional communication of identification, which can be burdensome, the disclosed subject matter can enable generation of a persona key (PK) that can be associated with an identity and can be easily communicated in an unobtrusive manner. Moreover, the persona key can be updated in a dynamic manner to be more secure by avoiding reuse of a static identifier for an extended period. Furthermore the disclosed persona key can be employed in encrypting/decrypting communicated data, can be used as a digital signature, or many other aspects.

In an embodiment, an internet protocol (IP) session identifier (SI) can be combined with user data to act as a representation of an individual. This representation can be termed a persona key (PK). Accordingly, as the IPSI changes, the persona key can be updated. The persona key can be correlated to information about the individual. The persona key can be used to access a portion of the correlated information. Additional factors can also be combined in generating the persona key, for example, time, location, user input, a proto-persona key, etc.

In an embodiment, a proto-persona key (PPK) can be combined with IPSI to generate a persona key. In some embodiments, a last PK can act as a next PPK for the identity, for example, where a first PPK is '123456' and an IPSI is 'abcde', then a resulting PK can be '123456abcde' (or '1a2b3c4d5e6', etc., depending on a selected combining technique). Continuing the example, the PK of '123456abcde' can be used as a second PPK, for example, where the IPSI changes to 'fg8x' as a result of a UE moving to a new radio access network (RAN) device, access point (AP), etc., then a new PK can be generated based on the second PPK and the new IPSI, e.g., '123456abcde' and 'fg8x' can result in a new PK of '123456abcdefg8x', etc. In general, more complex combining algorithms, e.g., more complex hashing, etc., can be used in place of the simple example of appending the IPSI to the PPK associated with an identity, and the disclosed subject matter is expressly not limited to the simplistic examples presented herein merely for the sake of clarity and brevity, even where such combining techniques are not explicitly recited herein.

In some embodiments, a generate PK can be communicated to enable access to a portion of the corresponding information about the individual. As an example, the PK can be generated on a mobile device and displayed, such as in a quick response (QR) code format, bar code format, image format, etc., that can be received by on optical sensor, such as at a point of sale (POS) device, a kiosk in a retail setting, etc., to allow another device access to a portion of the information about the individual, for example, a PK can be presented at retail kiosk and account information pertinent to the retail store from the individual's information can be retrieved and presented at a device of an employee of the retail store. In this example, the user is not required to provide a username, password, customer number, thumb print, iris scan, etc., to the retail clerk, rather, the user can simply wave their mobile device under an optical sensor to communicate relevant information to the retail clerk. In some embodiments, the PK can be communicated by other technologies, such as near field communication (NFC), BLUETOOTH, ZIGBEE, or other radio frequency (RF) technologies, laser, audio, etc. It is noted that the PK can be unique because it can be based on the most recent PPK, a current IPSI, a location of the UE, a user input, a time, a date, etc., which PK is correlated to a representation of the individual, e.g., data about the user stored on the UE or stored on a remote data store.

In some embodiments, user data can be extensive, and can act as a digital locker. Nearly any type of data can be correlated to the PK, e.g., dates, times, habits, account information, health records, relationships, purchase histories, web queries, or nearly any other data. Moreover, such as where a PK is used in a retail setting, supplementary information can be used in conjunction with the PK to filter what, if any, portion of accessible information is then communicated to the retail store equipment. As an example, where a user is a repeat purchaser of a first brand of mobile phones, and the user presents a PK at a mobile phone retail store, the UE location or other information indicating the user is at the mobile phone retail store can be used to filter returned information, such that, for example, the users recent purchase of bananas at the grocery store that morning are not presented to the mobile phone retail store systems.

In some embodiments, the PK can also be used in encryption/decryption of data. As an example, the PK can be used in a public/private key system to encrypt/decrypt data sent from a device to another device. In some embodiments, the PK can act as a digital signature, e.g., a PK can be encoded into a digital signing architecture. Numerous other uses of the representation of the identification can be readily appreciated by one of skill in the art, and all such uses are within the scope of the presented disclosure, even where not recited for the sake of clarity and brevity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate generation of a persona key based on session identification for a user equipment, in accordance with aspects of the subject disclosure. System 100 can comprise UE at location "A" 110. In an aspect, the UE can move to location "B", e.g., 112, to location "C", e.g., 114, etc. In system 100, when UE 110 can be connected to RAN device 102 and can be associated with an IPSI, e.g., session information 130. PK component 120 of UE 110 can generate PK 122. PK 122 can be based, at least in part, on IPSI 130 and user information (not illustrated), such as a PPK of a user identified as using UE at location "a" 110, etc. As such, PK 122 can be a representation of identification of that user that is different from PK 124 generated by PK component 120 of the UE when at location "B", e.g., 112, and associated with IPSI 132 for a connection to AP 104. Moreover, PK 122 and PK 124 can also be distinct form PK 126 for the UE at location "C", e.g., 114, that is associated with IPSI 134 from RAN device 106, however, each of PK 122, PK 124, and PK 126 can facilitate access to a portion of the same user data. As such, PK component 120 can provide a more secure representation than a static representation by employing IPSI for a current connection to a RAN device, AP, etc.

In some embodiments, PK 122 can act as a PPK for generation of PK 124, which can itself act as a PPK for generation of PK 126. In an example, PK 122 can be based on an earlier PPK and IPSI 130, the PPK can then be updated based on PK 122. Further, in the example, PK 124 can be based on the updated PPK, e.g., updated based on PK 122, etc., and can be combined with IPSI 132 to generate PK 124. PK 124 can then be used to again update the PPK, which in turn can be combined with IPSI 134 to generate PK 126. As such a current PPK can be based on an evolution of the PK. In an aspect, this can avoid possibly generating a repeat PK based on using a static PPK in conjunction with session information, e.g., where a same PPK is used to generate PK 122 each time the UE is at location "A" can be then PK 122 can, in some embodiments, be the same. However, where the UE moves from "A" to "B" and then back to "A", then the PK 122 is used to generate PK 124, with is then used to generate another PK upon the return to location "A" that would be different than PK 122. In some embodiments, other non-static factors can be included to reduce the likelihood of generating a same PK. Moreover, it is unlikely that the IPSI 130 would be the same as other session information upon the UE leaving and then returning to location "A", which can also reduce the likelihood of a repeating PK.

PK 122, PK 124, PK 126, etc., can be employed to access relevant data associated with a user of UE 110, 112, 114, etc., e.g., the same UE at different locations over time. In an aspect, PKs 122-126, etc., can be used at POS systems respectively located at A, B, C, etc., for example toll booths, movie theatres, grocery stores, clothing stores, hardware stores, restaurants, loyalty rewards programs, etc. In an aspect, PKs 122-126, etc., can be used in other retail systems, similarly respectively located at A, B, C, etc., such as to provide data to a clerk, provide vehicle maintenance data to a car dealership or mechanic, etc. In an aspect, PKs 122-126, etc., can be used in non-retail systems respectively located at A, B, C, etc., for example, to provide a driving record to a police officer, provide medical records to an ambulance crew or emergency medical technician, etc.

In some embodiments, the PK can also be used for encryption/decryption of data communicated from/to UE at locations A-C, e.g., 110-114, etc. As an example, the PK can be used in a public/private key system to encrypt/decrypt data sent from UE 110 to a financial institution server. In some embodiments, the PK can act as a digital signature. As examples, PK 124 can be used to 'sign a credit card receipt' at a restaurant at location B, PK 122 to sign a speeding ticket at location A, and PK 126 to check out a book at a library located at location C, etc. Numerous other uses of the representation of the identification can be readily appreciated by one of skill in the art, and all such uses are within the scope of the presented disclosure, even where not recited for the sake of clarity and brevity.

Figure 2:
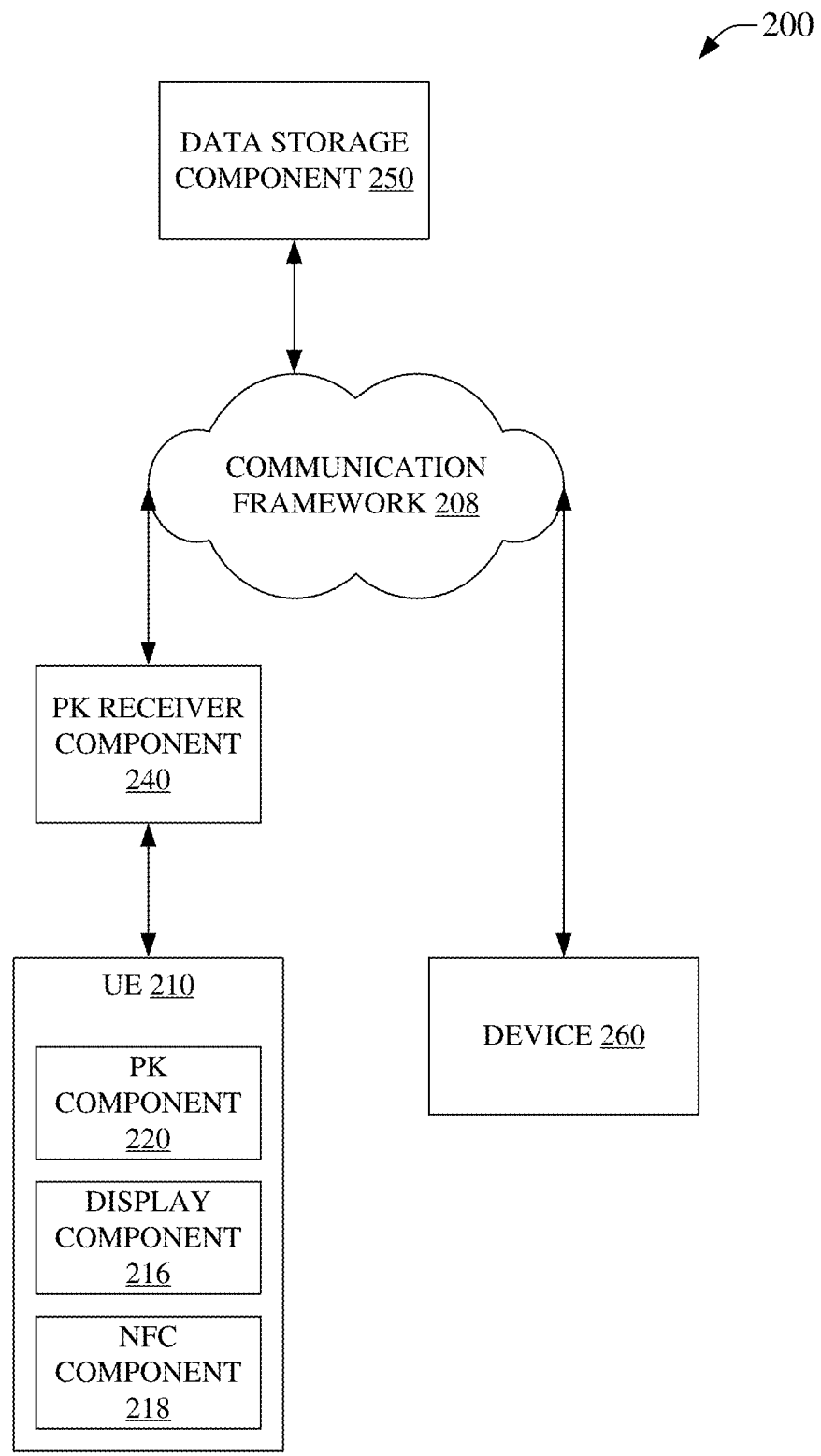
FIG. 2 is an illustration of an example system that can facilitate use of a generated persona key to access corresponding data by other devices, in accordance with aspects of the subject disclosure.

FIG. 2 is an illustration of a system 200, which can enable use of a generated persona key to access corresponding data by other devices, in accordance with aspects of the subject disclosure. System 200 can comprise UE 210 that can comprise PK component 220, display component 216, and NFC component 218. PK component 220 can generate a PK, as is disclosed elsewhere herein, e.g., based on IPSI and user data such as a PPK, etc. Display component 216, in an aspect, can display a graphical representation of the current PK generated by PK component 220, e.g., as a bar code, QR code, etc. Similarly, NFC component 218 can electrically communicate the PK to other devices.

System 200 can further comprise PK receiver component 240. PK receiver component 240 can receive a PK. In an embodiment, PK receiver component 240 can comprise an optical sensor that can receive a displayed PK, e.g., can scan a bar code, QR code, etc. In an embodiment, PK receiver component 240 can comprise an NFC component that can, for example, communicate with NFC component 218 to negotiate access to and/or receive the PK generated by PK component 220.

In an aspect, PK receiver component 240 can communicate a received PK, via communication framework 208, to enable access to corresponding user information stored on data storage component 250. As an example, data storage component 250 can be a data store in a core network component of a wireless communication network associated with a wireless communication provider identity that can store user data for one or more users corresponding to PKs, e.g., current PKs can be mapped to corresponding user data such that when a PK is provided by PK receiver component 240, the corresponding data can be returned. In some embodiments, data storage component 250 can be local to PK receiver component 240, e.g., where user data is stored in a data store resident at a retail store, etc., then the PK can be used to access locally stored data. These embodiments can, for example, be used in closed-loop systems such as military or law enforcement, corporate environments, etc., where user data is stored locally, for example, as a security measure, etc. In some embodiments, data storage component 250 can be comprised in UE 210, not illustrated, for example, to allow some data to be accessible without need of accessing a remote server or remote data store. As an example, this can allow a user to share access to customer files stored on a first UE, such as by generating PK on the first UE that is then scanned by a camera of a recipients UE, allowing the recipients UE to negotiate access to the files over the air with the first UE based on having received the PK.

In an aspect, system 200 can comprise device 260 that can receive data from data storage component 250 via communication framework 208. In an embodiment, device 260 can be affiliate with or, in some embodiments, comprise PK receiver component 240. As an example, device 260 can be a retail clerk mobile device and PK receiver component 240 can be a retail store NFC system, such that when UE 210 enters the retail store, a PK generated by PK component 220 can be communicated via NFC component 218 to PK receiver component 240 to fetch relevant data from data storage component 250 that is returned to device 260, such as to provide improved customer service to the user o UE 210 by the user of device 260 without need of asking for account numbers, passwords, thumbprints, usernames, addresses, phone numbers, membership cards, loyalty cards, etc. Rather, in this example, a customer can simply walk into a store and a clerk can approach the customer already supplied with relevant information to aid the customer.

Figure 3:
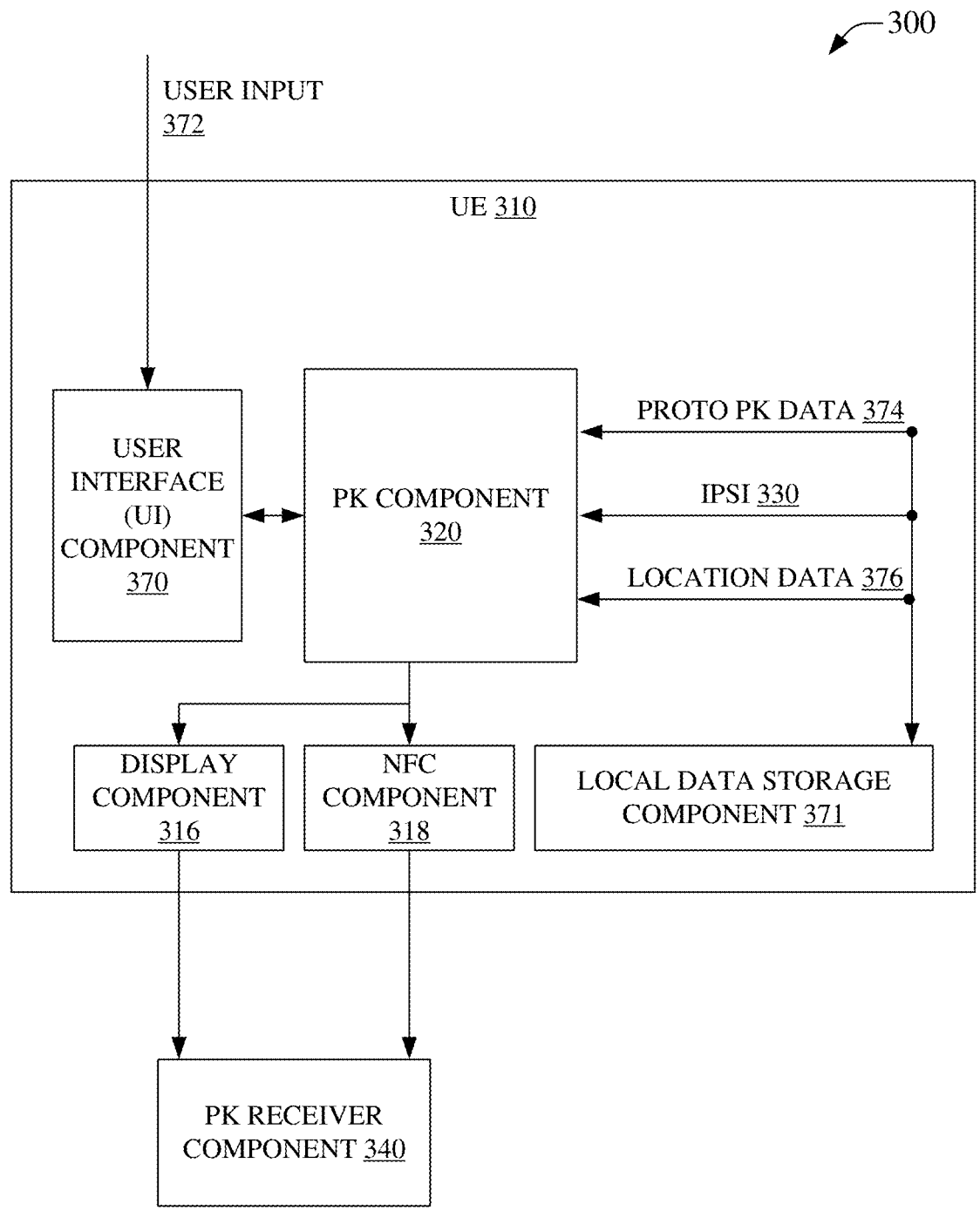
FIG. 3 is an illustration of an example system that can enable generation of a persona key based on locally received session identification for a user equipment, user input, proto-persona key data, and/or location data, in accordance with aspects of the subject disclosure.

FIG. 3 is an illustration of a system 300, which can facilitate generation of a persona key based on locally received session identification for a user equipment, user input, proto-persona key data, and/or location data, in accordance with aspects of the subject disclosure. System 300 can comprise UE 310 that can comprise PK component 320, display component 316, and NFC component 318. PK component 320 can generate a PK, as is disclosed elsewhere herein, e.g., based on IPSI and user data such as a PPK, etc. Display component 316, in an aspect, can display a graphical representation of the current PK generated by PK component 320, e.g., as a bar code, QR code, etc. Similarly, NFC component 318 can electrically communicate the PK to other devices.

UE 310 can further comprise user interface (UI) component 370. UI component 310 can receive input from a user, such as a passcode, password, etc. PK component 320 can employ user input 372 from UI component 370 in generating a PK. As an example, a PK can be generated based on an IPSI, user input 372, and a PPK.

In an embodiment, PK component 320 can receive PPK data 374, IPSI 330, e.g., IPSI, etc., location data 376, e.g., communicating a location of UE 310, etc., among other data. In some embodiments, PPK data 374, IPSI 330, location data 376, etc., can be stored at, retrieved from, etc., local data storage component 371. In an aspect, PPK data 374, IPSI 330, location data 376, etc., can be stored on a storage component of UE 310, such as a RAM, ROM, drive, etc. Local storage of data can allow communication of factors to PK component 320 enabling generation of a PK without need for a communication link, such as where UE 310 is a mobile device and an over the air connection is unavailable, etc. Further, local data storage component 371 can act as a cache for factors, allowing generation of a PK, even with a communication link, that can be faster than waiting for the factors to be retrieved via the communication link because one or more of the factors can be cached on local data storage component 371 for ready availability. In some embodiments, local data storage component 371 can also be used to update a remote data storage component, such as a data store on a network, etc. In some of these embodiments, this can enable local caching/use of factor(s) and then synchronizing the factor(s) with remote data store(s), e.g., at a time when use of the communicative connection is more favorable, such as when UE 310 is otherwise idle, when more bandwidth is available, etc.

System 300 can further comprise PK receiver component 340. PK receiver component 340 can receive a PK. In an embodiment, PK receiver component 340 can comprise a sensor that can receive a PK represented in a visual or audio format, e.g., can scan a bar code, QR code, receive a tonal representation, etc. In an embodiment, PK receiver component 340 can comprise an NFC component that can, for example, communicate with NFC component 318 to negotiate access to and/or receive the PK generated by PK component 320. In an aspect, PK receiver component 340 can communicate a received PK, via a communication framework, e.g., communication framework 208, etc., to enable access to corresponding user information.

Figure 4:
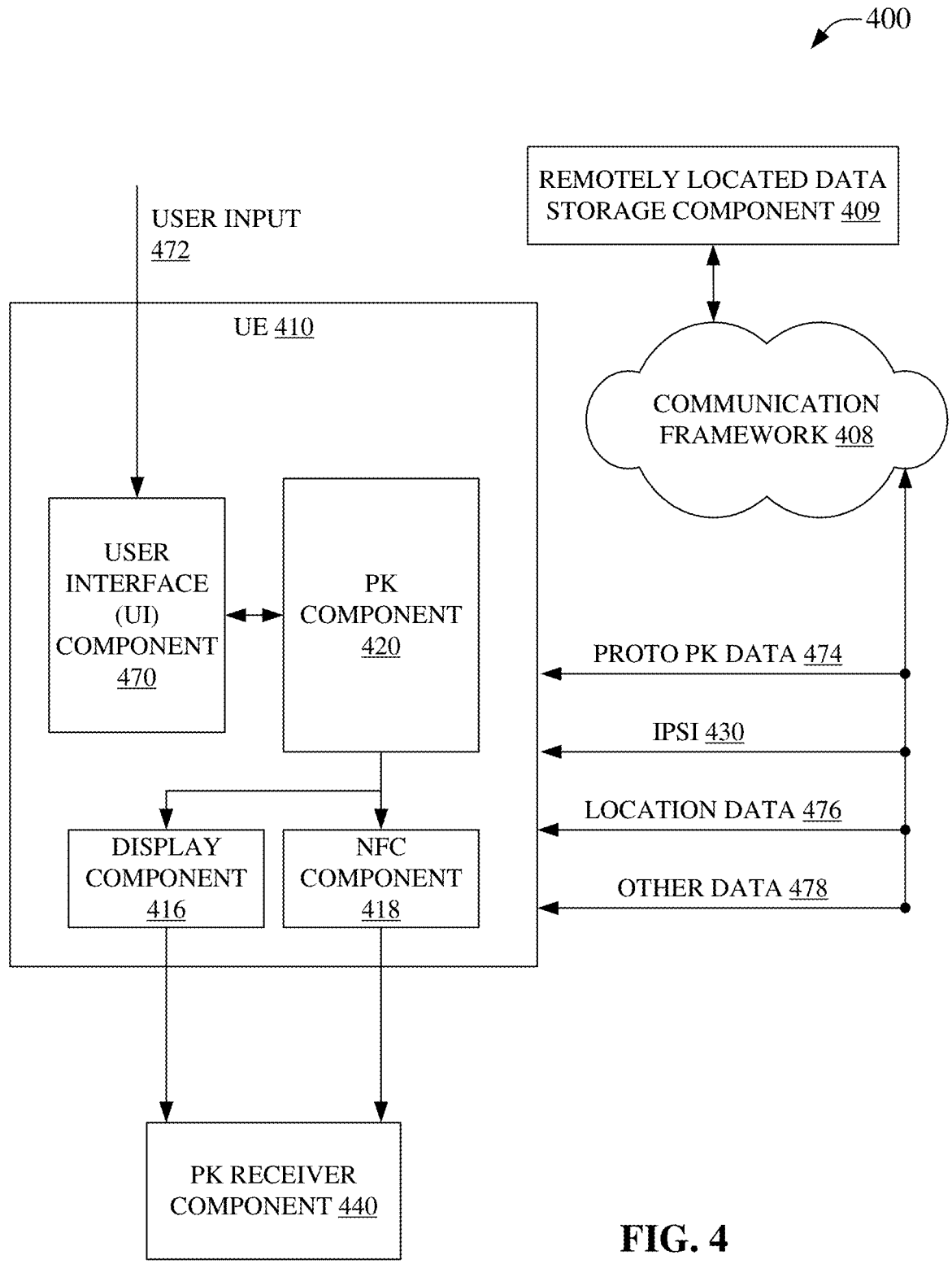
FIG. 4 illustrates an example system that can facilitate generation of a persona key based on remotely received session identification for a user equipment, user input, proto-persona key data, and/or location data, in accordance with aspects of the subject disclosure.

FIG. 4 is an illustration of a system 400, which can enable generation of a persona key based on remotely received session identification for a user equipment, user input, proto-persona key data, and/or location data, in accordance with aspects of the subject disclosure. System 400 can comprise UE 410 that can comprise PK component 420, display component 416, and NFC component 418. PK component 420 can generate a PK, as is disclosed elsewhere herein, e.g., based on IPSI and user data such as a PPK, etc. Display component 416, in an aspect, can display a graphical representation of the current PK generated by PK component 420, e.g., as a bar code, QR code, etc. Similarly, NFC component 418 can electrically communicate the PK to other devices.

UE 410 can further comprise user interface (UI) component 470. UI component 410 can receive input from a user, such as a passcode, password, etc. PK component 420 can employ user input 472 from UI component 470 in generating a PK. As an example, a PK can be generated based on an IPSI, user input 472, and a PPK.

In an embodiment, PK component 420 can receive PPK data 474, IPSI 430, e.g., IPSI, etc., location data 476, e.g., communicating a location of UE 410, etc., among other data 478 via an interface of UE 410 from a remote data source(s). In some embodiments, PPK data 474, IPSI 430, location data 476, other data 478, etc., can be stored at, retrieved from, etc., remotely located data storage component 409. In an aspect, remote storage of data can allow communication of factors to PK component 420 enabling generation of a PK without via communication framework 408, such as where UE 410 is a mobile device and an over the air connection is available, etc. Further, remotely located data storage component 409 can store data for multiple identities each affiliated with at least one PK and, accordingly, can allow generation of a PK relating to a corresponding identity. In an aspect, remotely located data storage component 409 can store data associated with activities of a user on UE 410, on devices other than UE 410, etc. As an example, a user can store personal computer and work computer activities, in addition to UE 410 activities, in a digital locker via remotely located data storage component 409, and these activities can be correlated to a PK to enable access to more persona data than might be available where it is stored only local to UE 410. In some embodiments, remotely located data storage component 409 can also be used to update a local data storage component, such as local data storage component 371, etc. In some of these embodiments, this can enable local caching/use of factor(s) and then synchronizing the factor(s) with remotely located data storage component 409.

In some embodiment(s), PK component 420 can be located remotely from UE 410, not illustrated. In these embodiments, the factors, e.g., PPK 474, IPSI 430, location data 476, other data 478, can be communicated to the remotely located PK component to generate a PK that can be returned to UE 410, e.g., for display via display component 416, or other communication, such as by NFC component 418, etc., to PK receiver component 440, etc. In an embodiment, a remotely located PK comp 420 can be communicated with via communication framework 408. In an embodiment, a remotely located PK component 420 can comprise remotely located data storage component 409, again not illustrated.

System 400 can further comprise PK receiver component 440. PK receiver component 440 can receive a PK. In an embodiment, PK receiver component 440 can comprise a sensor that can receive a PK represented in a visual or audio format, e.g., can scan a bar code, QR code, receive a tonal representation, etc. In an embodiment, PK receiver component 440 can comprise an NFC component that can, for example, communicate with NFC component 418 to negotiate access to and/or receive the PK generated by PK component 420. In an aspect, PK receiver component 440 can communicate a received PK, via a communication framework, e.g., communication framework 208, 408, etc., to enable access to corresponding user information.

Figure 5:
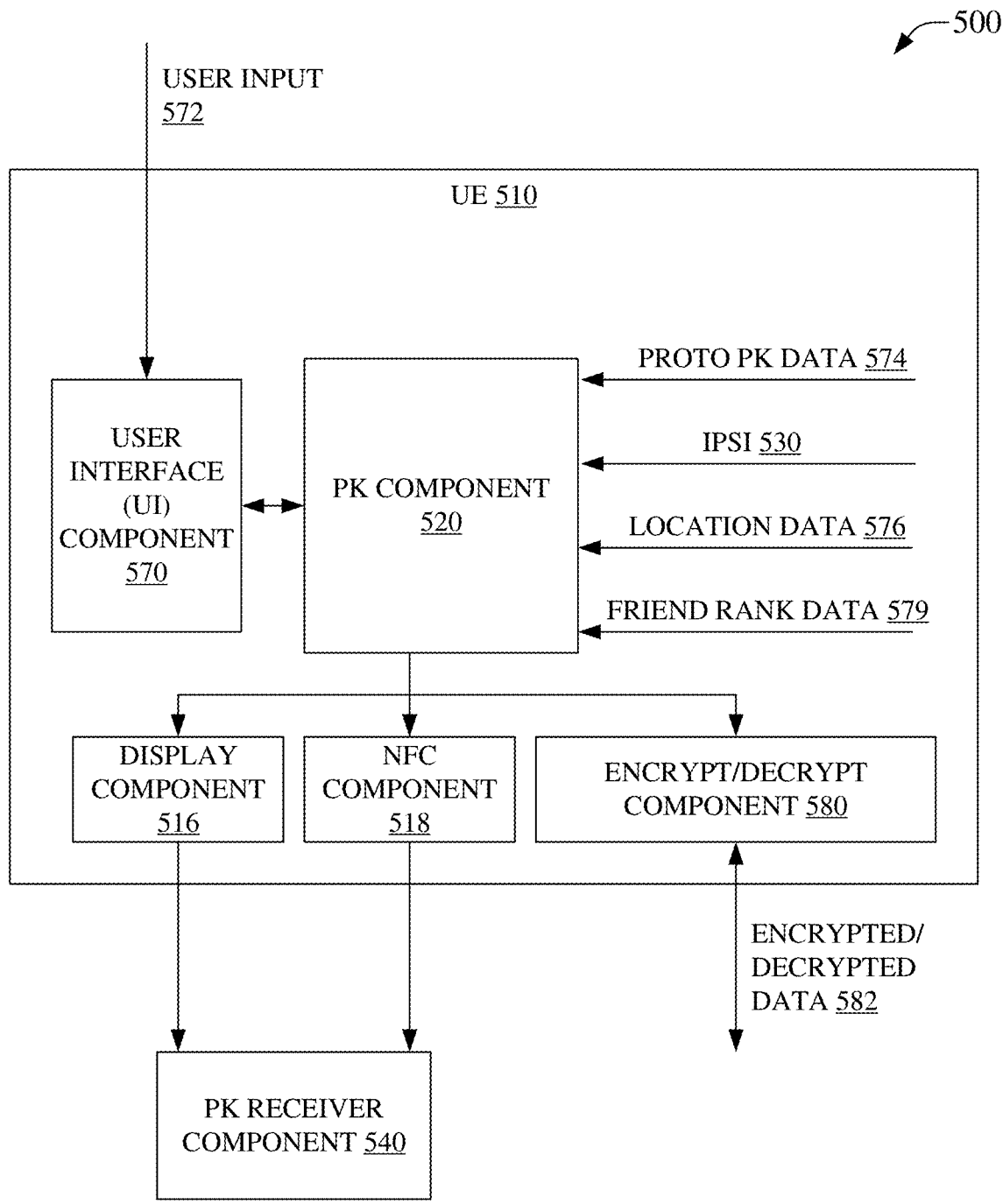
FIG. 5 is an illustration of an example system that can facilitate use of a generated persona key to access corresponding data by other devices and/or to encrypt/decrypt data communicated to other devices, in accordance with aspects of the subject disclosure.

FIG. 5 is an illustration of an example system 500, which enables use of a generated persona key to access corresponding data by other devices and/or to encrypt/decrypt data communicated to other devices, in accordance with aspects of the subject disclosure. System 500 can comprise UE 510 that can comprise PK component 520, display component 516, and NFC component 518. PK component 520 can generate a PK, as is disclosed elsewhere herein, e.g., based on IPSI and user data such as a PPK, etc. Display component 516, in an aspect, can display a graphical representation of the current PK generated by PK component 520, e.g., as a bar code, QR code, etc. Similarly, NFC component 518 can electrically communicate the PK to other devices.

UE 510 can further comprise user interface (UI) component 570. UI component 510 can receive input from a user, such as a passcode, password, etc. PK component 520 can employ user input 572 from UI component 570 in generating a PK. As an example, a PK can be generated based on an IPSI, user input 572, and a PPK.

In an embodiment, PK component 520 can receive PPK data 574, IPSI 530, e.g., IPSI, etc., location data 576, e.g., communicating a location of UE 510, etc., among other data. In some embodiments, PPK data 574, IPSI 530, location data 576, etc., can be stored at and/or retrieved from nearly any data store, e.g., local data storage component 371, remotely located data storage component 409, etc. Local storage of data can allow communication of factors to PK component 520 enabling generation of a PK without need for a communication link, such as where UE 510 is a mobile device and an over the air connection is unavailable, etc. Further, a local data storage component can act as a cache for factors, allowing generation of a PK, even with a communication link, that can be faster than waiting for the factors to be retrieved via the communication link because one or more of the factors can be cached on a local data storage component. In some embodiments, local data storage, e.g., via local data storage component 371, etc., and remote data storage, e.g., via remotely located data storage component 409, etc., can be synchronized, which can enable local caching/use of factor(s) and synchronizing the factor(s) with remote data store(s).

System 500 can further comprise PK receiver component 540. PK receiver component 540 can receive a PK. In an embodiment, PK receiver component 540 can comprise a sensor that can receive a PK represented in a visual or audio format, e.g., can scan a bar code, QR code, receive a tonal representation, etc. In an embodiment, PK receiver component 540 can comprise an NFC component that can, for example, communicate with NFC component 518 to negotiate access to and/or receive the PK generated by PK component 520. In an aspect, PK receiver component 540 can communicate a received PK, via a communication framework, e.g., communication framework 208, etc., to enable access to corresponding user information.

System 500 can also facilitate encryption/decryption of data to/from UE 510 based on a PK. PK component 520 can generate a PK that can be communicated to encryption/decryption component (EDC) 580. EDC 580 can then apply the PK to encryption of data sent from UE 510, e.g., as encrypted/decrypted data 582, etc. A receiving device, not illustrated, can decrypt encrypted data 582 based on the PK, e.g., the PK, or a portion thereof, such as in a public/private key embodiment, can be shared to a receiving device to allow decryption of received encrypted data. Similarly, receipt of encrypted data by UE 510 can be decrypted by EDC 580 based at least in part on a portion of a PK.

In an aspect, PK component 520 can receive friend rank data 579, which can indicate a rank of a website, uniform resource locator (URL), email address, IP address (IPv4, IPv6, etc.), etc., to facilitate determining a PK that can be used by EDC 580. As an example, a user can whitelist a work computer IP address, which can result in the IP address being highly ranked such that when communicated to PK component 520, a resulting PK can be automatically passed to EDC 580 to allow communications to the IP address of the work computer to be via encrypted/decrypted data 582.

Figure 6:
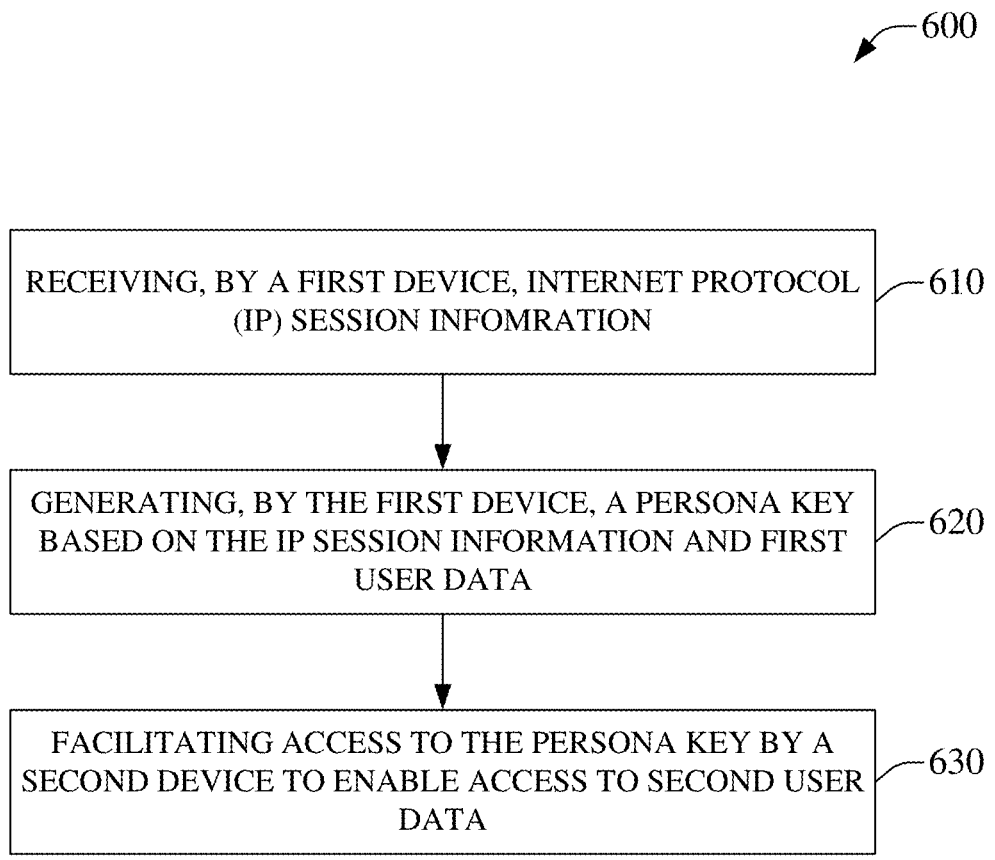
FIG. 6 is an illustration of an example method enabling access to a generated persona key by another device to enable to access corresponding data by the other device, in accordance with aspects of the subject disclosure.

FIG. 6 is an illustration of an example method 600, which facilitates access to a generated persona key by another device to enable to access corresponding data by the other device, in accordance with aspects of the subject disclosure. At 610, method 600 can comprise receiving IP session information (IPSI), by a first device. IPSI can comprise a unique session ID, which can, for example, aid in persisting state information between page requests, etc. Session IDs can be sent to a browser via session cookies, etc., and the ID can be used to retrieve existing session data. Thus, an IPSI can be used to generate a unique PK, more especially where combined with other data. Moreover, as the IPSI can change when a device moves from one access point to another access point or between sessions, this variability can aid in preventing a resulting PK from remaining static and therefore can improve security related to use of the PK to access correlated user information.

System 600, at 620, can comprise generating, by the first device, a PK based on the IPSI and a first user data. First user data can, in some embodiments, be a PPK, which PPK can, in some embodiments be based on a prior PK, e.g., a current PK can become a PPK that can be used to generate a next PK, etc. First user data can, in some embodiments be selected from a PPK, a user input, location data, time data, date data, etc. Moreover, in some embodiments, first user data can be more than one factor, e.g., a PPK and a location, a PPK and a time, a PPK, a time, and a date, etc.

At 630, method 600 can comprise, facilitating access to the PK by a second device. At this point, method 600 can end. The PK can enable the second device to access information about a user corresponding to the PK, e.g., second user data. The PK generated by the first device can be employed to access relevant data associated with a user by a second device, such as at POS system device, toll booth device, movie theater device, grocery store self-checkout device, clothing store register, hardware store kiosk, restaurant interactive menu, loyalty rewards program device, etc., for example, to provide data to a clerk, provide vehicle data, shopping history, relevant allergies, account information, billing information, credit card information, etc.

Figure 7:
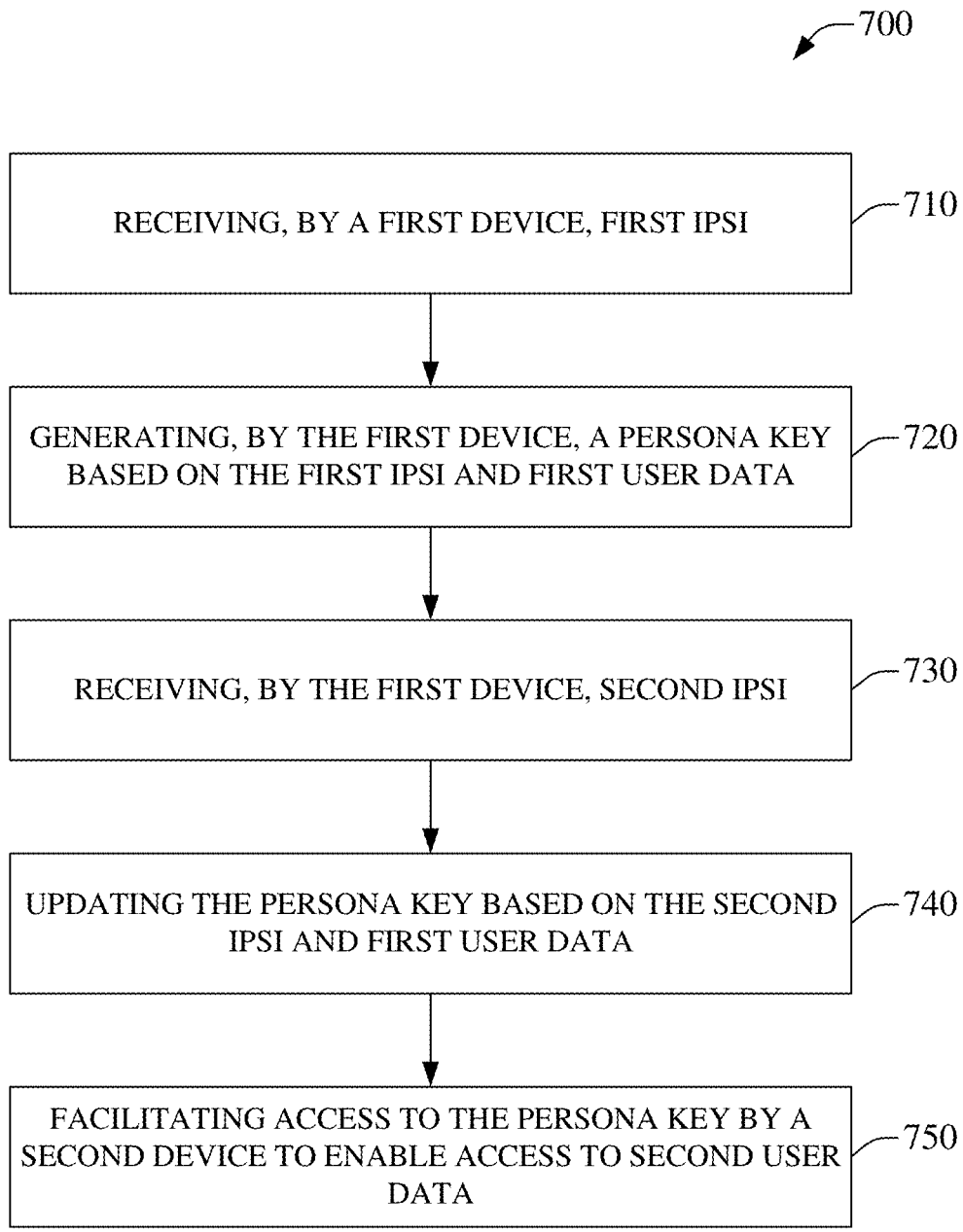
FIG. 7 illustrates an example method facilitating updating a generated persona key based on a change in session data, in accordance with aspects of the subject disclosure.

FIG. 7 illustrates example method 700 facilitating updating a generated persona key based on a change in session data, in accordance with aspects of the subject disclosure. Method 700, at 710, can comprise receiving, by a first device, first IPSI. First IPSI can be used to generate a unique PK, more especially where combined with other data.

At 720, system 700 can comprise generating, by the first device, a PK based on the first IPSI and first user data. First user data can, in some embodiments, be a PPK, which PPK can, in some embodiments be based on a prior PK, e.g., a current PK can become a PPK that can be used to generate a next PK, etc. First user data can, in some embodiments be selected from a PPK, a user input, location data, time data, date data, etc. Moreover, in some embodiments, first user data can be more than one factor, e.g., a PPK and a location, a PPK and a time, a PPK, a time, and a date, etc.

At 730, method 700 can comprise, receiving, by the first device, second IPSI. When the first device begins a new IP session, the IPSI can change, such as when the first device moves from one access point to another access point, is restarted, terminates the IP session associated with the first IPSI, spawns a new IP session associated with the second IPSI, etc. In an aspect, variability between the first IPSI and the second IPSI can aid in updating the PK in a non-static manner and therefore can improve security related to use of the PK to access correlated user information.

Method 700, at 740, can update the PK based on the second IPSI and the first user data. Where the second IPSI is different from the first IPSI, the resulting updated PK can be different than the PK resulting from the first IPSI. In an embodiment, the update can comprise generating a second PK in response to the receiving the second IPSI, wherein the second PK replaces the PK generated by the first IPSI. In some embodiments, the PK generated by the first IPSI can become last PPK, and the last PPK can be used in conjunction with the second IPSI to generate a second PK or to update the first PK.

At 750, system 700 can comprise facilitating access to the PK, e.g., the updated, second PK, etc., from 740, by a second device. At this point, method 700 can end. The PK can enable the second device to access information about a user corresponding to the PK, e.g., second user data. The PK generated by the first device can be employed to access relevant data associated with a user by a second device, such as at POS system device, toll booth device, movie theater device, grocery store self-checkout device, clothing store register, hardware store kiosk, restaurant interactive menu, loyalty rewards program device, etc., for example, to provide data to a clerk, provide vehicle data, shopping history, relevant allergies, account information, billing information, credit card information, etc.

Figure 8:
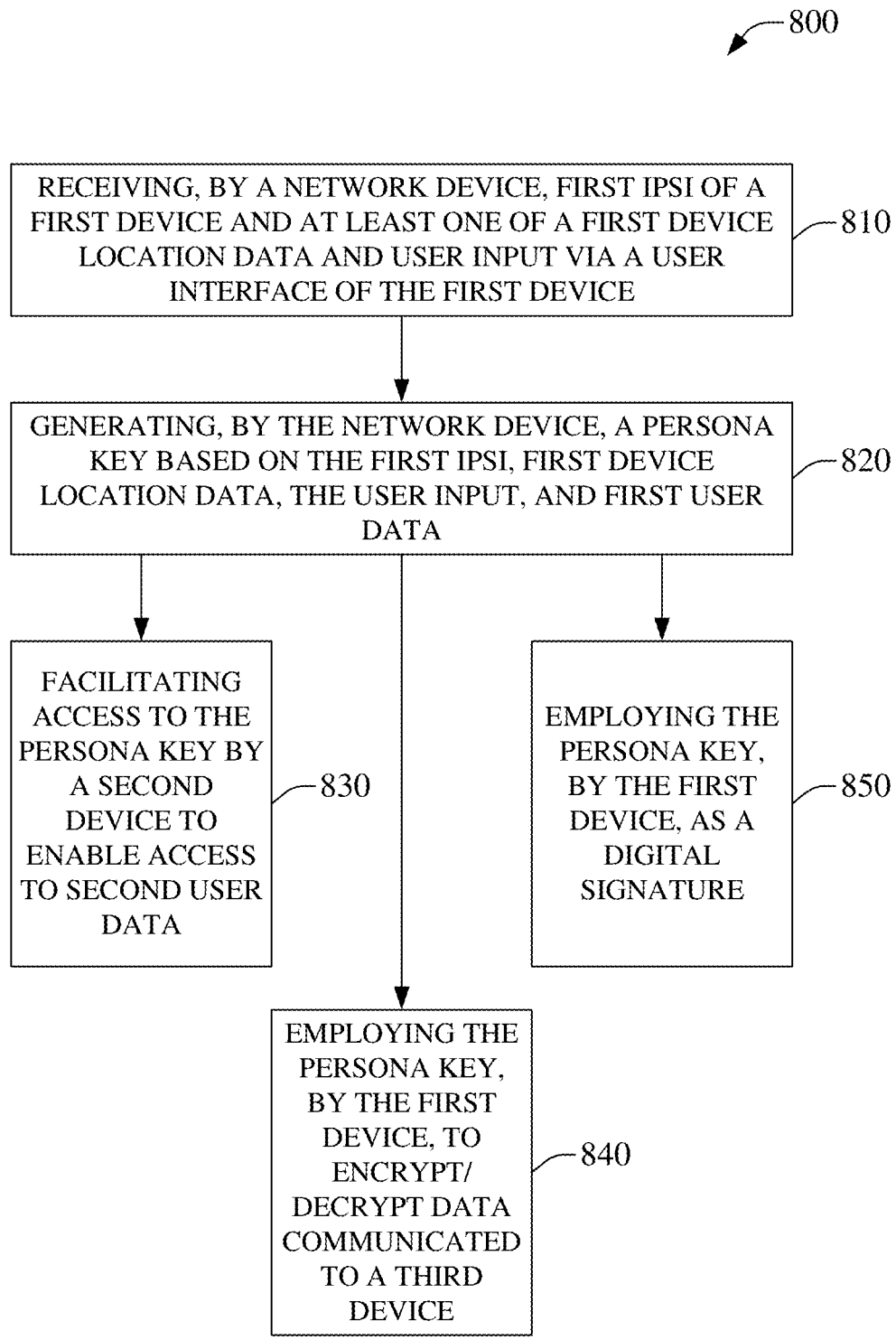
FIG. 8 illustrates an example method enabling access to a generated persona key by another device to enable to access corresponding data by the other device, encrypting/decrypting communicated data based on the persona key, and employing the persona key as a digital signature, in accordance with aspects of the subject disclosure.

FIG. 8 illustrates example method 800 enabling access to a generated persona key by another device to enable to access corresponding data by the other device, encrypting/decrypting communicated data based on the persona key, and employing the persona key as a digital signature, in accordance with aspects of the subject disclosure. Method 800, at 810, can comprise receiving, by a network device, first IPSI for a first device. At 810, the network device can also revive at least one of a location of the first device, e.g., first device location data, and a user input. The user input can be input via a user interface of the first device.

System 800, at 820, can comprise generating, by the network device, a PK based on the first IPSI, first user data, and one or more of the first device location, the user input, etc. First user data can be a PPK. In some embodiments, the PPK can be based on a prior PK. First user data, in some embodiments, can also comprise a time, date, etc. The multiple factors can be combined to generate a PK that can be highly variable from other PKs, which can provide improved security in comparison to less variable PKs, or worse, static PKs.

Method 800 can perform one or more actions as illustrated at 830-850. At 830, method 800 can comprise, prior to ending, facilitating access to the PK by a second device. The PK can enable the second device to access information about a user corresponding to the PK, e.g., second user data. This second user data can facilitate billing, charging, suggesting products and/or service, rendering customer service, etc., based on the portion of the user data returned as second user data, e.g., the PK is employed to access relevant data that can be provided to another device to aid in providing a service or product to a user of the first device.

At 840, method 800 can comprise, prior to ending, employing the PK by the first device to encrypt/decrypted data communicated to a/from a third device. Encryption/decryption of data to/from the third device can be based on the PK, e.g., via encryption/decryption component 580, etc. The PK can be applied to encryption of data sent from the first device. The third device, e.g., a receiving device, can decrypt encrypted data based on the PK, e.g., the PK, or a portion thereof, such as in a public/private key embodiment, can be shared to the third device to allow decryption of received encrypted data. Similarly, receipt of encrypted data by the first device, form the third device, can be decrypted based on at least a portion of the PK.

At 850, method 800 can comprise, prior to ending, employing the PK by the first device as a digital signature. Whereas the PK can be highly variable and can be correlated to a representation of identification for a user, it can serve as a digital signature element. As such, the PK, or a portion thereof, can be employed as a digital signature, the PK can be combined with other data to serve as a digital signature, etc.

Figure 9:
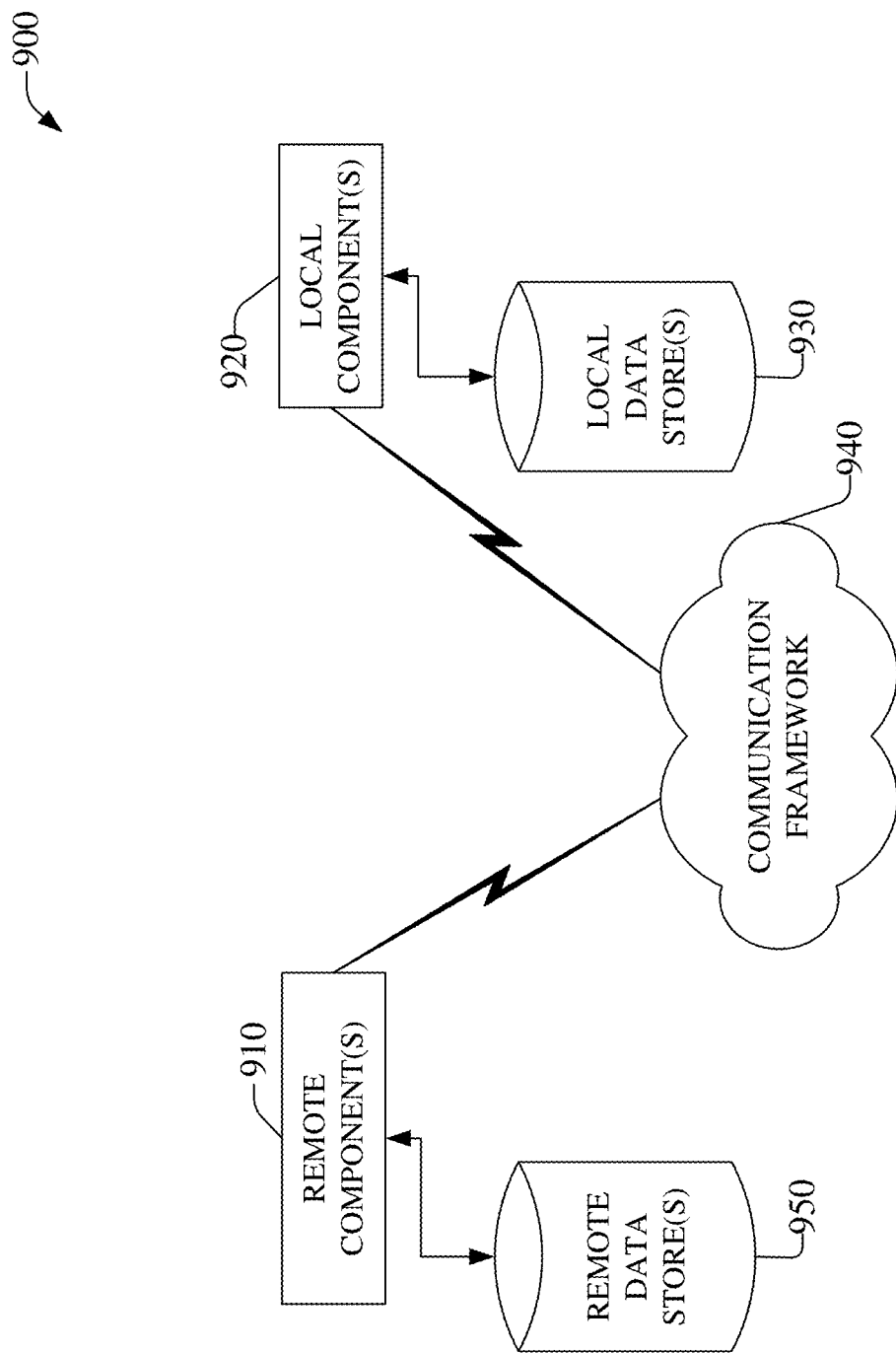
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise data storage component 250, PK receiver component 340, 440, 540, etc., remotely located data storage component 409, etc., or other component(s) or device(s) that are located remotely from PK component 120-520, etc.

The system 900 also comprises one or more local component(s) 920. The local component(s) 920 can be hardware and/or software (e.g., threads, processes, computing devices). In some embodiments, local component(s) 920 can comprise PK component 120-520, etc., UE 110, 112, 114, 210-510, etc., PK receiver component 340-540, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. As an example, UE 410 can be communicatively coupled to remotely located data storage component 409 via communication framework 408 to facilitate generating a PK. Similarly, local component(s) 920 can be operably connected to one or more local data store(s) 930, that can be employed to store information on the local component(s) 920 side of communication framework 940. As an example, UE 310 can comprise local data storage component 371 to store factors, generated PKs, etc.

Figure 10:
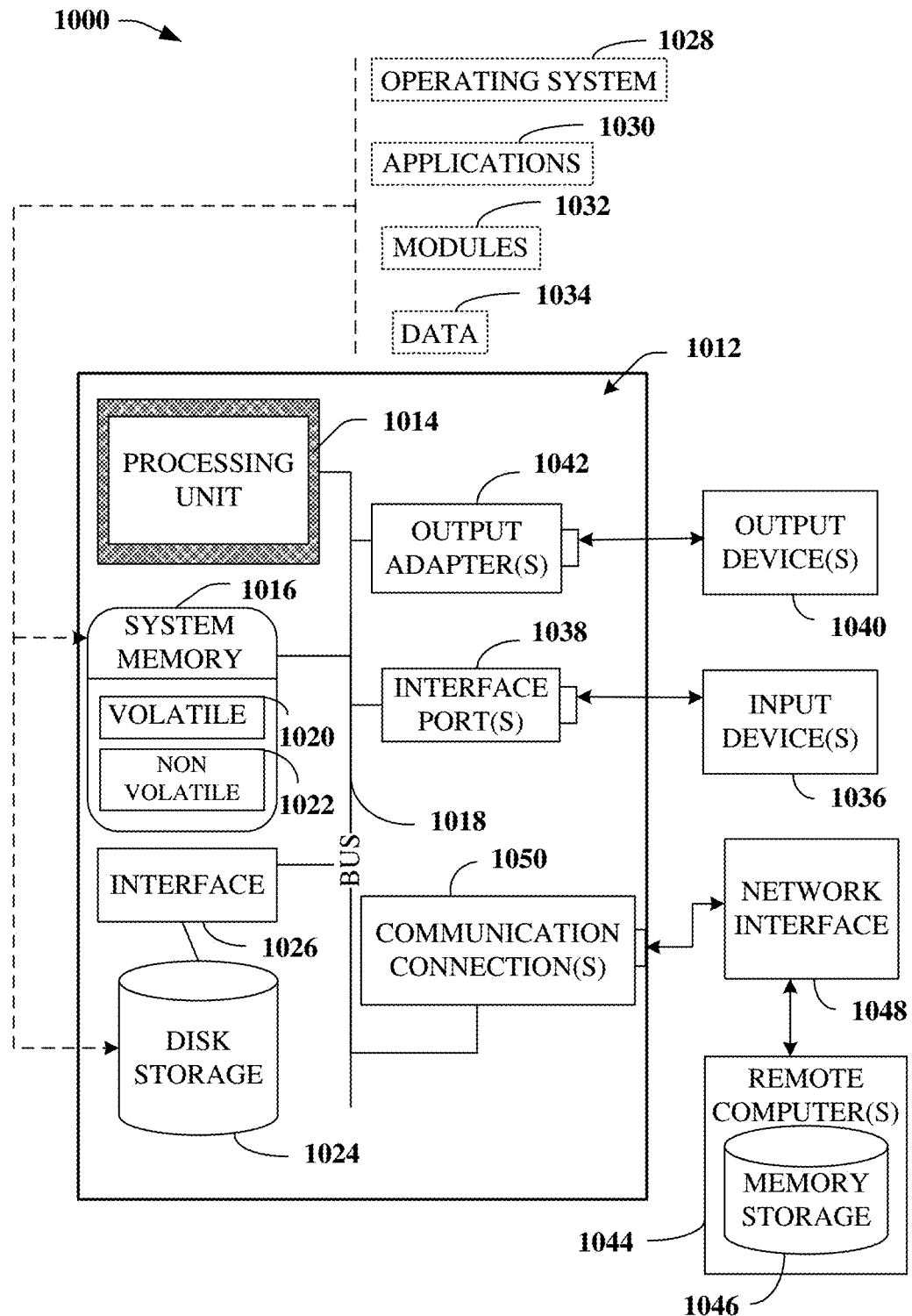
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in PK component 120-520, etc., UE 110, 112, 114, 210-510, etc., RAN 102, 106, etc., AP 104, etc., EDC 580, etc., or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising initiating a slice event based on a slice event instruction corresponding to analysis of network analytics for various portions of a network, and can be based on rules and/or inferences related to the analysis of the network analytics.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted elsewhere herein, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," "5G network radio," and the like, are utilized interchangeably in the subject application, and refer to a wireless network component or appliance that serves and receives data, control, voice, video, sound, gaming, or substantially any datastream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A mobile device, comprising:
a processor; and
a memory that stores executable instructions that, when executed by the processor, facilitate performance of operations, comprising:
receiving internet protocol session information representative of an internet protocol session;
generating, at the mobile device, a persona key based on combining user data with the internet protocol session information, wherein the user data and the internet protocol session information are synchronized with a data storage device accessible via a network carrier core network device to facilitate correlation of the persona key to a user profile; and
communicating the persona key to a first device to enable a second device to receive information from the data storage device related to the user profile that is correlated to the persona key, wherein the first device and the second device are different devices than the mobile device, and wherein the first device and the second device are different devices than the data storage device.

2. The mobile device of claim 1, wherein the internet protocol session information is first internet protocol session information representative of a first internet protocol session, and wherein the operations further comprise:
in response to receiving second internet protocol session information representative of a second internet protocol session, updating the persona key at the mobile device based on the second internet protocol session information.

3. The mobile device of claim 1, wherein the internet protocol session information is first internet protocol session information representative of a first internet protocol session, wherein the persona key is a first persona key, wherein the user data is first user data, and wherein the operations further comprise:
generating second user data based on the first user data and the first persona key;
in response to receiving second internet protocol session information representative of a second internet protocol session, generating a second persona key at the mobile device based on the second internet protocol session information and the second user data; and
communicating the second persona key to the second device to enable the second device to receive information related to the user profile correlated to the second persona key.

4. The mobile device of claim 1, wherein the generating of the persona key is further based on location data representative of a location of the mobile device.

5. The mobile device of claim 4, wherein the generating of the persona key is further based on date data representative of a date associated with use of the first internet protocol session.

6. The mobile device of claim 1, wherein the generating of the persona key is further based on time data representative of a time associated with use of the first internet protocol session.

7. The mobile device of claim 1, wherein the generating of the persona key is further based on input received via a user interface of the mobile device.

8. The mobile device of claim 7, wherein the input is a passcode received via the user interface.

9. The mobile device of claim 1, wherein the user profile corresponds to a user of the mobile device.

10. The mobile device of claim 1, wherein the first device and the second device are a same device.

11. The mobile device of claim 1, wherein the communicating of the persona key to the first device is via a technology selected from a group of technologies comprising an optical bar code technology, an optical quick response code technology, an audio technology, a wireless communications technology, and a near field communication technology.

12. A user equipment, comprising:
a processor; and
a memory that stores executable instructions that, when executed by the processor, facilitate performance of operations, comprising:
  generating a persona key at the user equipment, based on internet protocol session information associated with the user equipment and user data associated with the user equipment, and wherein the internet protocol session information and the user data are synchronized with a user profile stored at a network carrier data storage device; and
  employing the persona key, by communicating the persona key to a first device, to enable communicating a portion of the information of the user profile correlated to the persona key from the network carrier data storage device to the first device.

13. The user equipment of claim 12, wherein the communicating of the persona key is via an optical modality selected from a group of optical modalities comprising a bar code modality and a quick response code modality.

14. The user equipment of claim 12, wherein the communicating of the persona key is via a radio frequency modality selected from a group of radio frequency modalities comprising a near field communication modality, a short-range wireless communication modality, a low-power personal area network wireless communication modality, and a local area network wireless communication modality.

15. The user equipment of claim 12, wherein the first device enables access to the information of the user profile via a second device.

16. The user equipment of claim 12, wherein the network carrier data storage device is located remotely from the first device.

17. A method, comprising:
  generating, by a user equipment comprising a processor, a persona key based on first internet protocol session information associated with the user equipment and user data associated with the user equipment, wherein the first internet protocol session information and the user data are synchronized to a network carrier data storage device to facilitate correlating a user profile with the persona key; and
  communicating, by the user equipment, the persona key to a first device to facilitate communicating information related to the user profile correlated to the persona key from the network carrier data storage device to a second device.

18. The method of claim 17, further comprising, updating, by the user equipment, the persona key in response to receiving second internet protocol session information associated with the user equipment.

19. The method of claim 17, wherein the generating of the persona key is based on user data comprising a proto-persona key, and wherein the generating of the persona key is further based on a factor selected from the group of factors comprising a time, a date, a location of the user equipment, and a user input received via a user interface of the user equipment.

20. The method of claim 17, further comprising, encrypting, by the user equipment based on the persona key, data communicated between the user equipment and an endpoint device.

* * * * *